(12) United States Patent
Legler

(10) Patent No.: US 9,801,490 B1
(45) Date of Patent: Oct. 31, 2017

(54) STAND FOR TURKEY FRYING

(76) Inventor: William P Legler, Erie, PA (US)

( * ) Notice: Subject to any disclaimer, the term of this patent is extended or adjusted under 35 U.S.C. 154(b) by 1266 days.

(21) Appl. No.: 12/657,582

(22) Filed: Jan. 21, 2010

(51) Int. Cl.
*A47J 37/12* (2006.01)
*A47J 27/60* (2006.01)

(52) U.S. Cl.
CPC ...................... *A47J 27/60* (2013.01)

(58) Field of Classification Search
USPC .......... 99/415, 418, 403, 419–421; 211/85.4, 211/106.01; 248/188.4
See application file for complete search history.

(56) References Cited

U.S. PATENT DOCUMENTS

| | | | | |
|---|---|---|---|---|
| 2,584,295 A | * | 2/1952 | Sanzenbacher | 99/419 |
| 3,583,307 A | * | 6/1971 | Lee, Sr. | 99/333 |
| 5,106,642 A | * | 4/1992 | Ciofalo | 426/509 |
| 5,896,810 A | * | 4/1999 | Barbour | 99/415 |

* cited by examiner

*Primary Examiner* — Melba Bumgarner
*Assistant Examiner* — Amir Klayman
(74) *Attorney, Agent, or Firm* — Richard K. Thomson

(57) ABSTRACT

A turkey stand for use in deep frying a turkey or other fowl. The stand includes a rod which is threaded on a first end and flattened on the opposite end. The threaded end is received through central holes in 2 of 3 legs and threaded into a collar secured to the third. Each of the three legs has V-shaped bends near each end forming 2 feet, with the bends increasing in depth to accommodate the variation in distance from the support surface. Thus, each of the feet engages the bottom of the fry pot without any rocking.

14 Claims, 2 Drawing Sheets

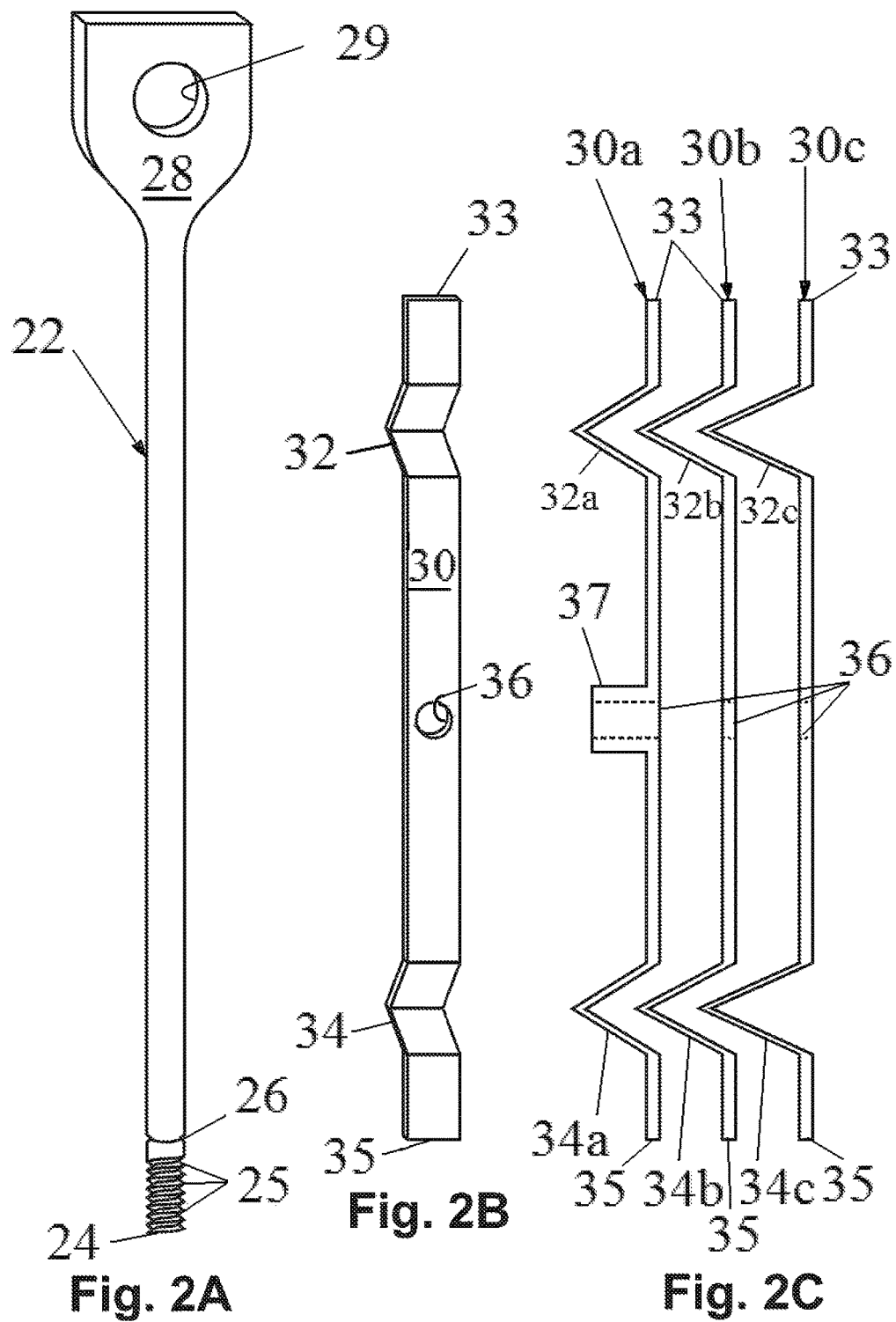

STAND FOR TURKEY FRYING

BACKGROUND AND SUMMARY OF THE INVENTION

The present invention is directed to the field of cooking. More particularly, the present invention is directed to a turkey stand for use in deep frying the bird.

Deep frying turkey has become extremely popular, not just at Thanksgiving and Christmas, but year round. Not only is the cooking time greatly reduced (3-5 minutes per pound), the resulting white meat is moist and juicy, rather than the dry, stick-in-your-throat product which frequently results from conventional baking. This revised method of cooking gives rise to the need for new tools for use in the task.

A number of turkey stands/supports have been proposed. Problems with these devices range from failure to drain easily/completely, to being bulky and not being easily stored. The turkey stand of the present invention has reduced surface area which facilitates drainage and can be disassembled to permit the component parts to be easily stored in a drawer.

The turkey stand of the present invention comprises a) a rod having a first threaded end, a stop formed adjacent the first threaded end, and a second flattened end with a hook-receiving hole; b) a plurality of legs each having a plurality of downwardly protruding feet and a central hole for receiving the first threaded end of the rod, at least one of the central holes having a collar with internal threads for receiving the first threaded end of the rod. The plurality of legs preferably comprises three elongated, rectangular plate members crossing at the central holes to form six individual leg members which extend outwardly like spokes. Each of the six legs has two protruding feet. Most preferably, the two feet are formed by a downward V-shaped bend near each end portion of each of the plurality of legs. The three elongated rectangular plate members are positioned on top of each other to form a stack and each V-shaped bend in the leg's end portion is progressively deeper proceeding up the stack allowing each of the six feet on the six leg members to simultaneously engage a surface there beneath. The rod and the plurality of legs may be easily disassembled to permit compact storage in a drawer. The elements of the turkey stand are preferably supplied as a kit which the user may easily assemble.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which

FIG. 2A is a perspective front view of the threaded rod of the first embodiment;

FIG. 2B is a top perspective view of one of the legs of the first embodiment; and, FIG. 2C is a side view of the three legs of the first embodiment.

DETAILED DESCRIPTION OF THE PREFERRED EMBODIMENT(S)

Figure 1:
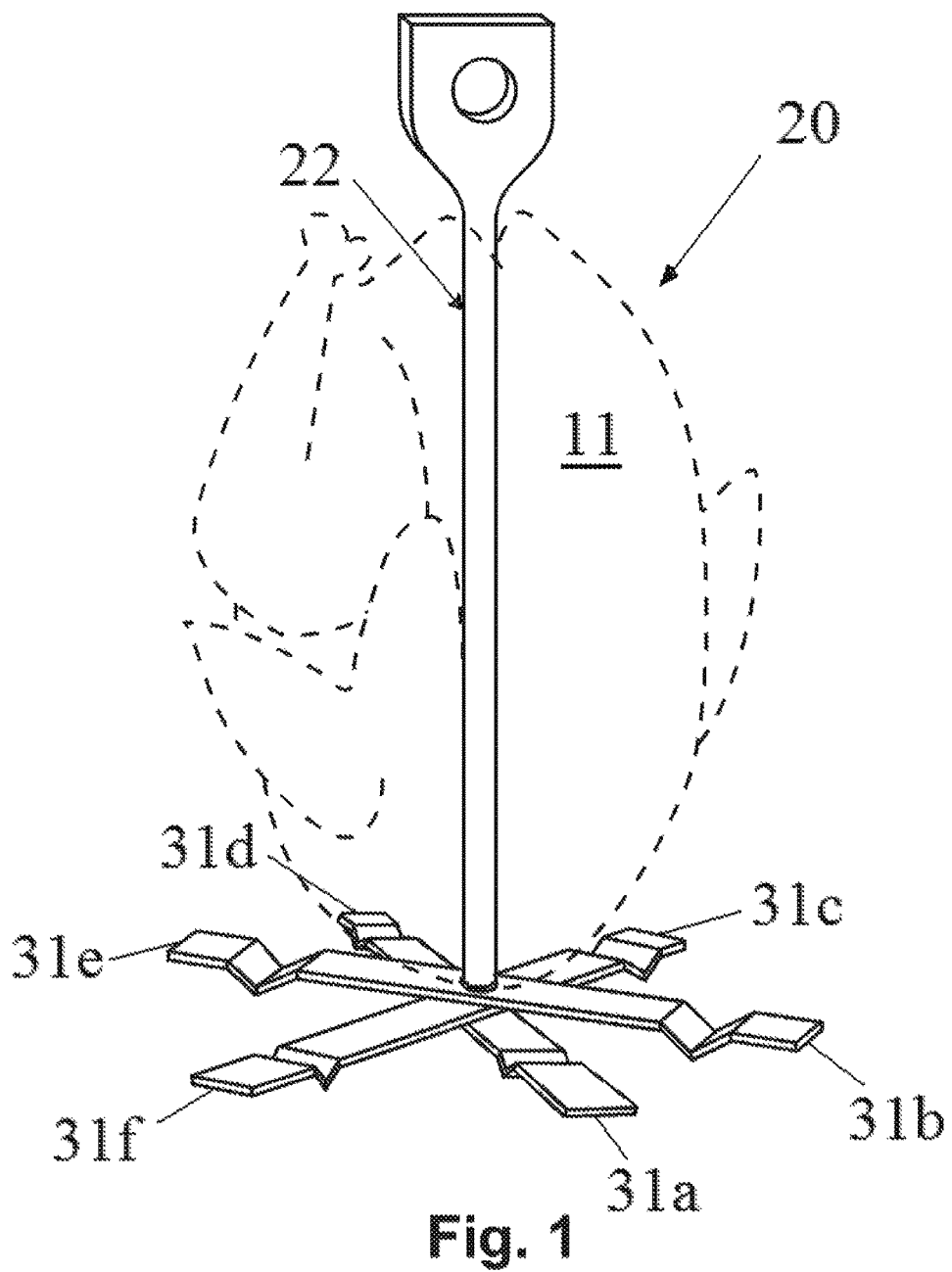
FIG. 1 is a perspective front view of a first embodiment of the turkey stand of the present invention.

A first embodiment of the turkey stand of the present invention is depicted in FIG. 1 generally at 20. Turkey stand 20 includes a rod 22 having a first threaded end 24 (FIG. 2A) with a shoulder stop 26 formed adjacent the threads 25. While shoulder 26 may take the form a plate, or the like, affixed to the rod 22, it is envisioned that shoulder 26 is most preferably formed by swaging, or otherwise, deflecting some metal outwardly beyond the dimensions of the cylindrical portion of rod 22. The function of shoulder 26 is to prevent uppermost leg 30 from migrating upwardly along rod 22 under load. Upper end 28 of rod 22 is flattened and provided with a hole 29 which permits a hook (not shown) to be inserted and used to insert and retrieve the turkey stand 20 with turkey 11 thereon from the fryer (not shown).

Each of the three legs 30a, 30b, 30c is formed as a rectangular plate and has two feet 32, 34 formed by a V-shaped bend in the rectangular plate near the ends 33 and 35. Each of legs 30a, 30b, 30c has a central hole 36 which receive the threaded end 24 of rod 22 such that leg members 31a-f radiate outwardly like spokes of a wheel. Leg 30a has leg 30b stacked thereon with leg 30c sitting atop the stack. Since the rectangular plates forming legs 30a, 30b, 30c are ⅛" thick, the V-shaped bend forming feet 32b, 34b are ⅛" deeper than those of 32a, 34a, with those of 32c, 34c being an additional ⅛" deeper. In this way, all six feet sit firmly on the surface upon which the turkey stand 20 is placed. The purpose of feet 32, 34 is to stand the bird 11 off of the bottom to reduce the likelihood that the leading end will be burned due to proximity to the bottom of the pot. Lowermost leg 30a has an internally threaded collar 37 which receives threads 25 of rod 22.

Turkey stand 20 of the present invention supports bird 11 in an upright position during its submersion in the cooking oil and permits it to be readily extracted when cooking is complete. Elements 22, 30a, 30b, 30c may be readily disassembled for cleaning and then, compactly, stored in a drawer. It is envisioned that the pieces of stand 20 will be sold as a kit with instructions regarding assembly and use.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A stand for supporting a turkey in a fry pot said stand consisting essentially of
    a) a rod having a first threaded end, a stop formed adjacent said first threaded end, and a second vertically extending, laterally flattened end with a hook-receiving hole extending through said laterally flattened end from a first side to a second side, said rod having sufficient length to extend through a length of the turkey;
    b) a plurality of legs each having a plurality of downwardly protruding feet and a central hole for receiving said first threaded end of said rod,
    c) nut means having internal threads for receiving said first threaded end of said rod to secure said plurality of legs to said first threaded end.

2. The stand of claim 1 wherein said plurality of legs comprises a plurality of elongated members crossing at said central holes to form a plurality of individual leg members.

3. The stand of claim 1 wherein said plurality of protruding feet comprise two for each of said plurality of legs.

4. The stand of claim 3 wherein said two feet are formed by a downward V-shaped bend near each end portion of each of said plurality of legs.

5. The stand of claim 4 wherein said plurality of legs are positioned on top of each other to form a stack and each V-shaped bend in said end portion is progressively deeper proceeding up said stack allowing each of said plurality of feet on said plurality of legs to simultaneously engage a surface there beneath.

6. The stand of claim 5 wherein said rod and said plurality of legs may be easily disassembled to permit compact storage in a drawer or the like.

7. A kit including a plurality of components for assembling to form a turkey stand, said kit consisting essentially of
   a) a rod having a first threaded end, a stop formed adjacent said first threaded end, and a second laterally flattened end with a hook-receiving hole extending through said laterally flattened end from a first side to a second side, said rod having sufficient length to extend through a length of the turkey;
   b) a plurality of legs each having a plurality of downwardly protruding feet and a central hole for receiving said first threaded end of said rod,
   c) nut means having internal threads for receiving said first threaded end of said rod to secure said plurality of legs to said first threaded end;
   whereby said components of said kit may be readily disassembled for ease of storage.

8. The stand of claim 7 wherein said plurality of legs comprises a plurality of elongated members crossing at said central holes to form a plurality of individual leg members.

9. The stand of claim 8 wherein said plurality of protruding feet comprise two for each of said plurality of legs.

10. The stand of claim 9 wherein said two feet are formed by a downward V-shaped bend near each end portion of each of said plurality of legs.

11. The stand of claim 10 wherein said plurality of elongated are positioned on top of each other to form a stack and each V-shaped bend in said end portion is progressively deeper proceeding up said stack allowing each of said plurality of feet on said plurality of legs to simultaneously engage a surface there beneath.

12. The stand of claim 11 wherein said rod and said plurality of legs may be easily disassembled to permit compact storage in a drawer of the like.

13. The stand of claim 1 wherein said nut means comprises a collar attached to at least one of said plurality of central holes.

14. The stand of claim 7 wherein said nut means comprises a collar attached to at least one of said plurality of central holes.

* * * * *